(12) United States Patent
Chatar

(10) Patent No.: US 12,252,979 B2
(45) Date of Patent: Mar. 18, 2025

(54) EVENT DETECTION FROM PUMP DATA

(71) Applicant: Schlumberger Technology Corporation, Sugar Land, TX (US)

(72) Inventor: Crispin Chatar, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/609,441

(22) Filed: Mar. 19, 2024

(65) Prior Publication Data

US 2024/0218784 A1 Jul. 4, 2024

Related U.S. Application Data

(63) Continuation of application No. 17/594,389, filed as application No. PCT/US2019/028045 on Apr. 18, 2019, now Pat. No. 12,018,560.

(51) Int. Cl.
*E21B 47/06* (2012.01)
*G01V 1/50* (2006.01)

(52) U.S. Cl.
CPC ............ *E21B 47/06* (2013.01); *G01V 1/50* (2013.01); *E21B 2200/20* (2020.05); *G01V 2210/663* (2013.01)

(58) Field of Classification Search
CPC ...... E21B 47/06; E21B 2200/20; E21B 47/00; G01V 1/50; G01V 2210/663
See application file for complete search history.

(56) References Cited

U.S. PATENT DOCUMENTS

| 10,036,203 | B2* | 7/2018 | Herbig | E21B 47/02 |
|---|---|---|---|---|
| 10,113,418 | B2 | 10/2018 | Kusuma | |
| 11,726,223 | B2 | 8/2023 | Rose | |
| 2017/0131174 | A1* | 5/2017 | Enev | G01M 3/2815 |
| 2017/0328199 | A1 | 11/2017 | Marsh | |
| 2018/0045043 | A1* | 2/2018 | Hernandez | E21B 47/18 |
| 2019/0055836 | A1 | 2/2019 | Felkl | |
| 2022/0214170 | A1* | 7/2022 | Singh | G01C 21/3811 |

FOREIGN PATENT DOCUMENTS

WO 2019032925 A1 2/2019

OTHER PUBLICATIONS

Search Report and Written Opinion of International Patent Application No. PCT/US2019/028045 dated Jan. 17, 2020, 11 pages.

* cited by examiner

*Primary Examiner* — Aditya S Bhat
(74) *Attorney, Agent, or Firm* — Jeffrey D. Frantz

(57) ABSTRACT

A method for detecting an event includes measuring a pressure of a fluid with a pressure sensor. The method also includes generating a pressure spectrogram based at least in part on the pressure. The method also includes comparing the pressure spectrogram to a plurality of historical pressure spectrograms. The historical pressure spectrograms have previously been determined to be related to one or more events. The method also includes determining that the pressure spectrogram is related to an event based at least partially upon the comparison.

20 Claims, 5 Drawing Sheets

EVENT DETECTION FROM PUMP DATA

CROSS-REFERENCE TO RELATED APPLICATIONS

This application is a continuation of Ser. No. 17/594,389, filed Oct. 14, 2021, which is the National Stage Entry of International Application No. PCT/US2019/028045, filed Apr. 18, 2019.

BACKGROUND

A downhole tool in a wellbore may include a logging-while-drilling (LWD) tool and/or a measurement-while-drilling (MWD) tool that is/are configured to capture data downhole. The downhole tool may be configured to transmit the data to the surface by mud pulse telemetry, which includes generating pressure pulses in the fluid (e.g., mud) in the wellbore. The pulses may be sensed and/or recorded at the surface by a sensor (e.g., a pump pressure sensor) and subsequently demodulated to obtain the data.

In addition, the sensor may sense and/or record pressure data at a plurality of frequencies. The pressure data at these frequencies may be used to generate a pressure spectrogram (i.e., a visual representation of a spectrum of frequencies in the pulses over time). When an event occurs in the subterranean formation (e.g., in the wellbore and/or proximate to the downhole tool), evidence of the event may sometimes be present in the spectrogram. However, detecting the evidence of the event in the spectrogram is difficult. Moreover, even if the evidence is able to be detected, identifying the particular details of the event from the evidence is difficult.

SUMMARY

A method for detecting an event is disclosed. The method includes measuring a pressure of a fluid with a pressure sensor. The method also includes generating a pressure spectrogram based at least in part on the pressure. The method also includes comparing the pressure spectrogram to a plurality of historical pressure spectrograms. The historical pressure spectrograms have previously been determined to be related to one or more events. The method also includes determining that the pressure spectrogram is related to an event based at least partially upon the comparison.

In another embodiment, the method includes measuring a first pressure of a first fluid. The method also includes generating a first pressure spectrogram based at least in part on the first pressure. The method also includes detecting a first event. The method also includes identifying data related to the first event in the first pressure spectrogram. The method also includes measuring a second pressure of a second fluid. The method also includes generating a second pressure spectrogram based at least in part on the second pressure. The method also includes comparing the second pressure spectrogram to the first pressure spectrogram. The method also includes identifying data related to a second event in the second pressure spectrogram based at least partially upon the comparison.

A system for detecting an event is also disclosed. The system includes a pump configured to cause fluid to flow into a wellbore. A downhole tool in the wellbore introduces pulses into the fluid. The system also includes a pressure sensor configured to measure a pressure of the fluid. The system also includes a computing system configured to generate a pressure spectrogram based at least in part on the pressure. The computing system is also configured to compare the pressure spectrogram to a plurality of historical pressure spectrograms. The historical pressure spectrograms have previously been determined to be related to one or more events. The computing system is also configured to determine that the pressure spectrogram is related to an event based at least partially upon the comparison.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
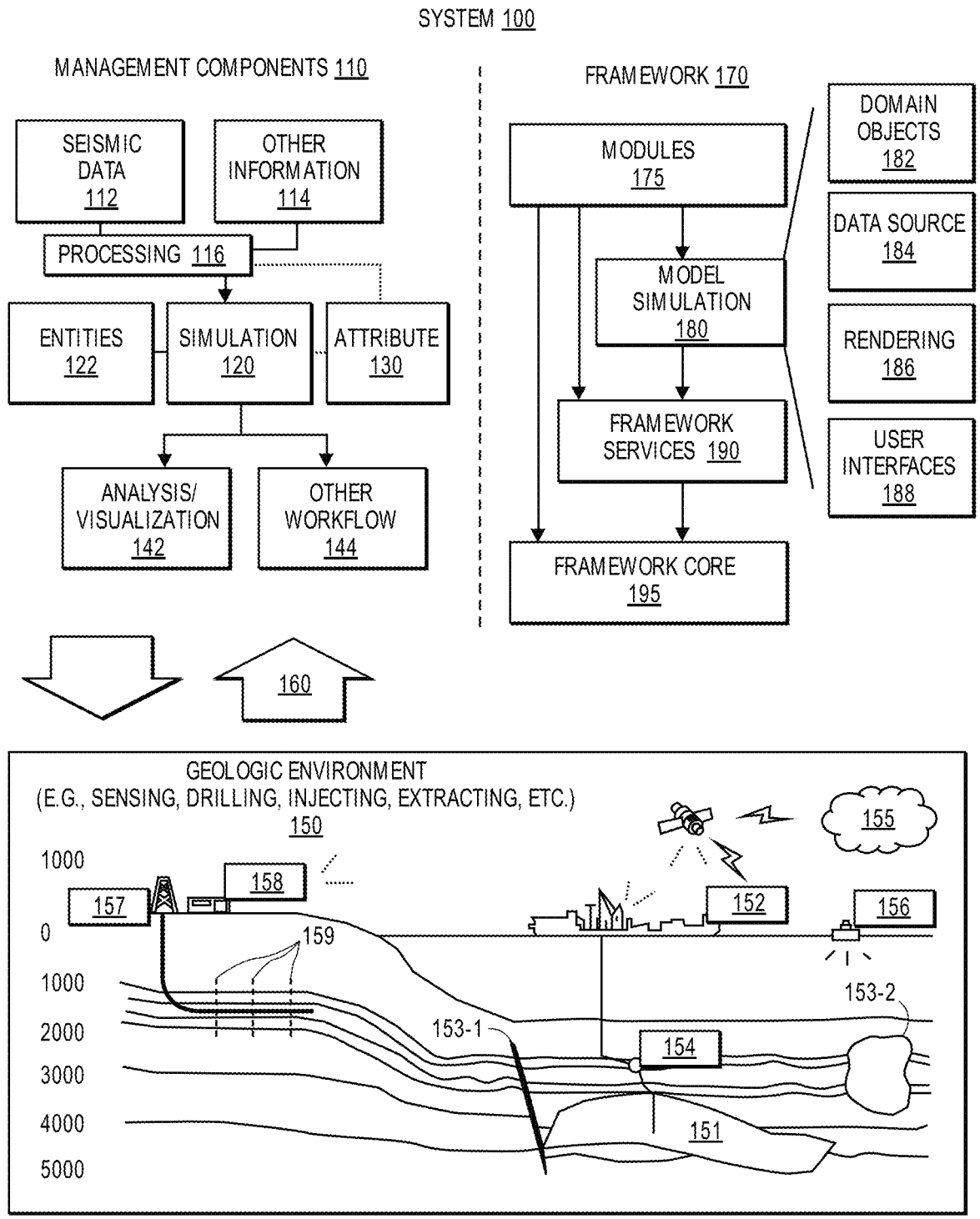
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
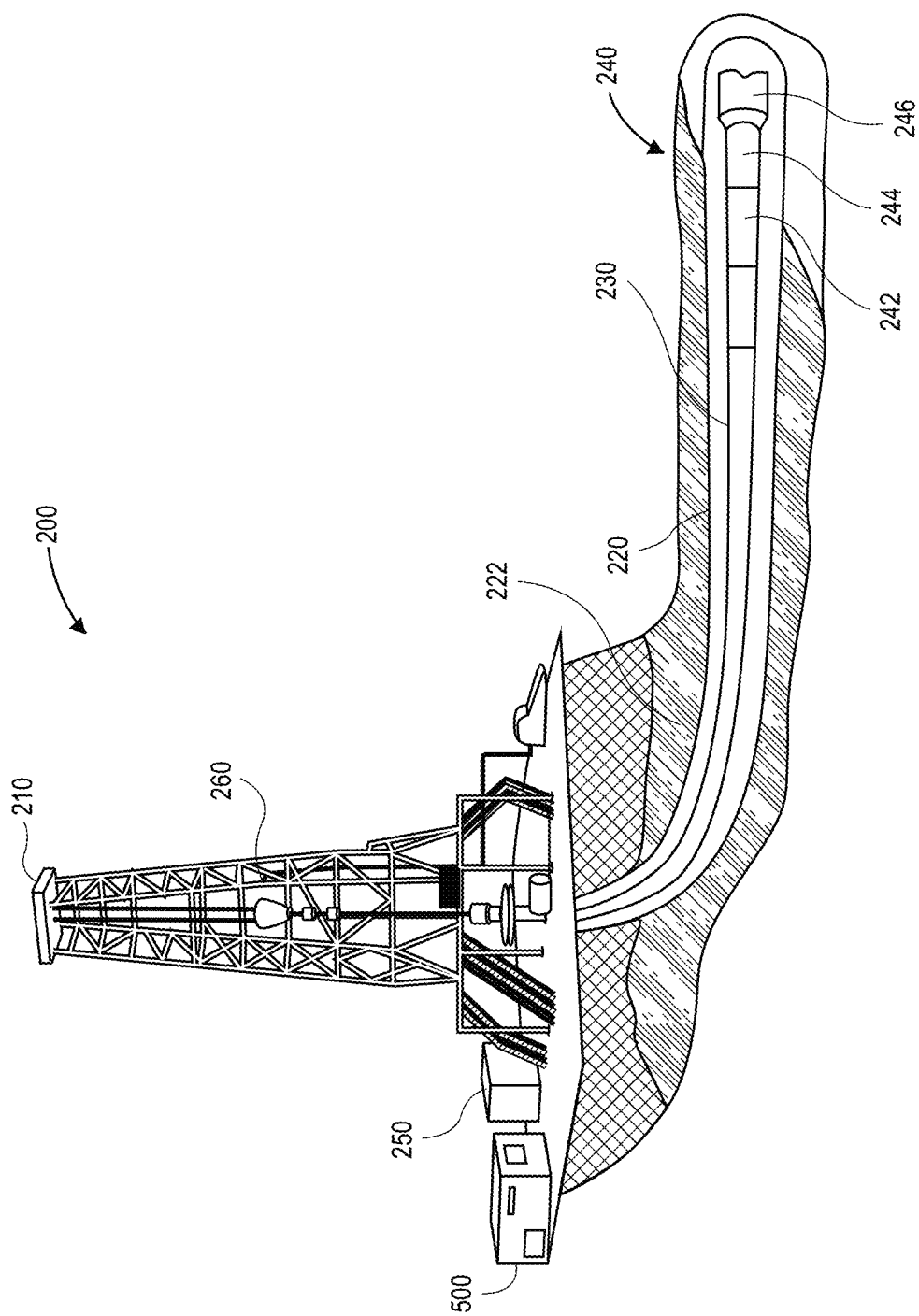
FIG. 2 illustrates a schematic view of a wellsite, according to an embodiment.

FIG. 2 illustrates a schematic view of a wellsite 200, according to an embodiment. The wellsite 200 may include a rig 210 positioned above a wellbore 220 that is formed in a subterranean formation 222. A tubular string 230 may extend from the rig 210 into the wellbore 220. In one embodiment, the tubular string 230 may be or include a drill string made of a plurality of drill pipe segments. A downhole tool 240 may be coupled to (e.g., an end of) the tubular string 230 in the wellbore 220. The downhole tool 240 may be or include a MWD 242, a LWD 244, and a drill bit 246. The MWD 242 and/or the LWD 244 may be configured to capture measurements as the drill bit 246 drills the wellbore 220 farther into the subterranean formation 222.

A pump 250 may be positioned at the surface. The pump 250 may be configured to pump fluid (e.g., drilling mud) into the wellbore 220. More particularly, the fluid may flow (e.g., downward) from the pump 250, through the tubular string 230, and to the downhole tool 240. The fluid may then exit the downhole tool 240 and flow back (e.g., upward) through an annulus between the tubular string 230 and a surrounding tubular (e.g., a liner, a casing, or the wall of the wellbore 220) to the surface.

The downhole tool 240 may selectively restrict the fluid flow through the downhole tool 240 to encode the captured measurements as pressure pulses (in the fluid) that are transmitted to the surface. A pressure sensor 260 at the surface (e.g., coupled to or proximate to the rig 210) may measure the pressure of the fluid being pumped into and/or out of the wellbore 220. Thus, the pressure sensor 260 may sense/measure the pressure pulses from the downhole tool 240.

The pressure sensor 260 may be in communication with a computing system 500 at the surface (e.g., coupled to or proximate to the rig 210). The computing system 500 is described below with respect to FIG. 5. The pressure sensor 260 and/or the computing system 500 may be configured to process/analyze the pressure from the pressure sensor 260, as described in greater detail below, to detect an event in the subterranean formation. As used herein, an "event" affects normal drilling, completion, and/or production operations. Such events cause a pressure effect (i.e., have a pressure signature) that is present in the pressure measured by the pressure sensor 260. For example, illustrative events may be or include the tubular string 230 and/or downhole tool 240 being stuck in the wellbore 220, the tubular string 230 and/or downhole tool 240 twisting-off, a washout, a blowout, failure of the pump 250, and the like.

Figure 3:
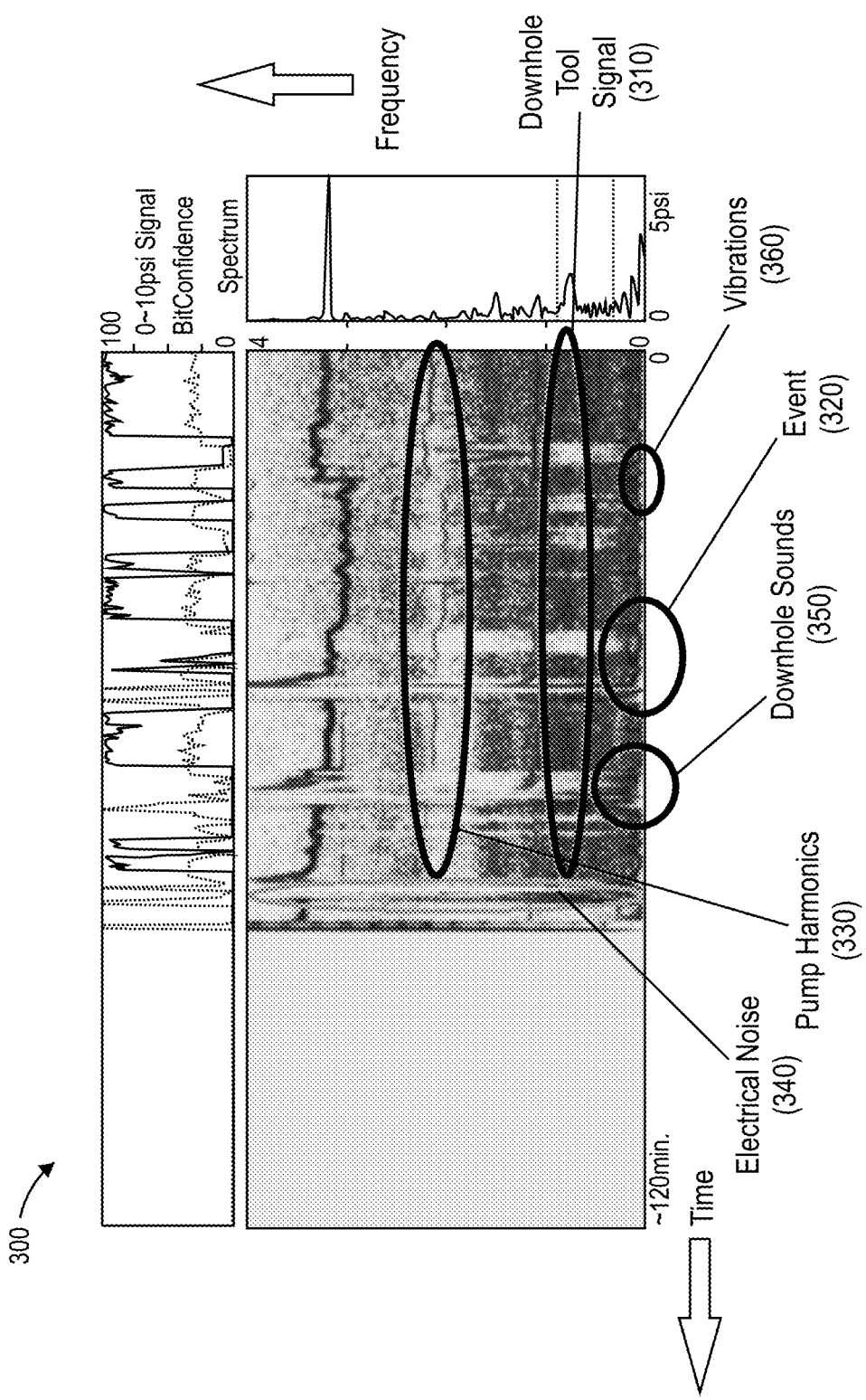
FIG. 3 illustrates a pressure spectrogram generated using measurements from a pressure sensor at the wellsite, according to an embodiment.

FIG. 3 illustrates a pressure spectrogram 300 generated using measurements from the pressure sensor 260, according to an embodiment. The spectrogram 300 has time on the X-axis and frequency on the Y-axis. The spectrogram 300 may include data related to the pressure pulses from the downhole tool 240, which may be referred to as the downhole tool signal 310. The spectrogram 300 may also include data 320 related to an event. The event data 320 may be from one or more of the events described above.

The spectrogram 300 may also include data 330 related to the pump 250. More particularly, the pump data 330 may be or include harmonics of the pump 250. The spectrogram 300 may also include data 340 related to electrical noise at the wellsite 200. The electrical noise may be generated by motors, generators, or other electrical wellsite equipment. The spectrogram 300 may also include data 350 related to downhole sounds. The downhole sounds may be generated by (e.g., axial or rotational) movement of the tubular string 230 and/or the downhole tool 240, drilling by the drill bit 246, etc. The spectrogram 300 may also include data 360 related to vibrations. The vibrations may be generated by the tubular string 230, the downhole tool 240, and/or equipment at the surface (e.g., the pump 250).

The spectrogram 300 may be used to determine if the downhole tool signal 310 is being interfered with by the pump 250, the electrical noise, the downhole sounds, the vibrations, or a combination thereof. If interference is present, the (e.g., frequency of the) downhole tool signal 310 may be modified (e.g., increased or decreased) to avoid the interference. In other embodiments, the pump 250, the components generating the electrical noise, the components generating the downhole sounds, the components generating the vibrations, or a combination thereof may be modified to avoid the interference with the downhole tool signal 310.

Figure 4:
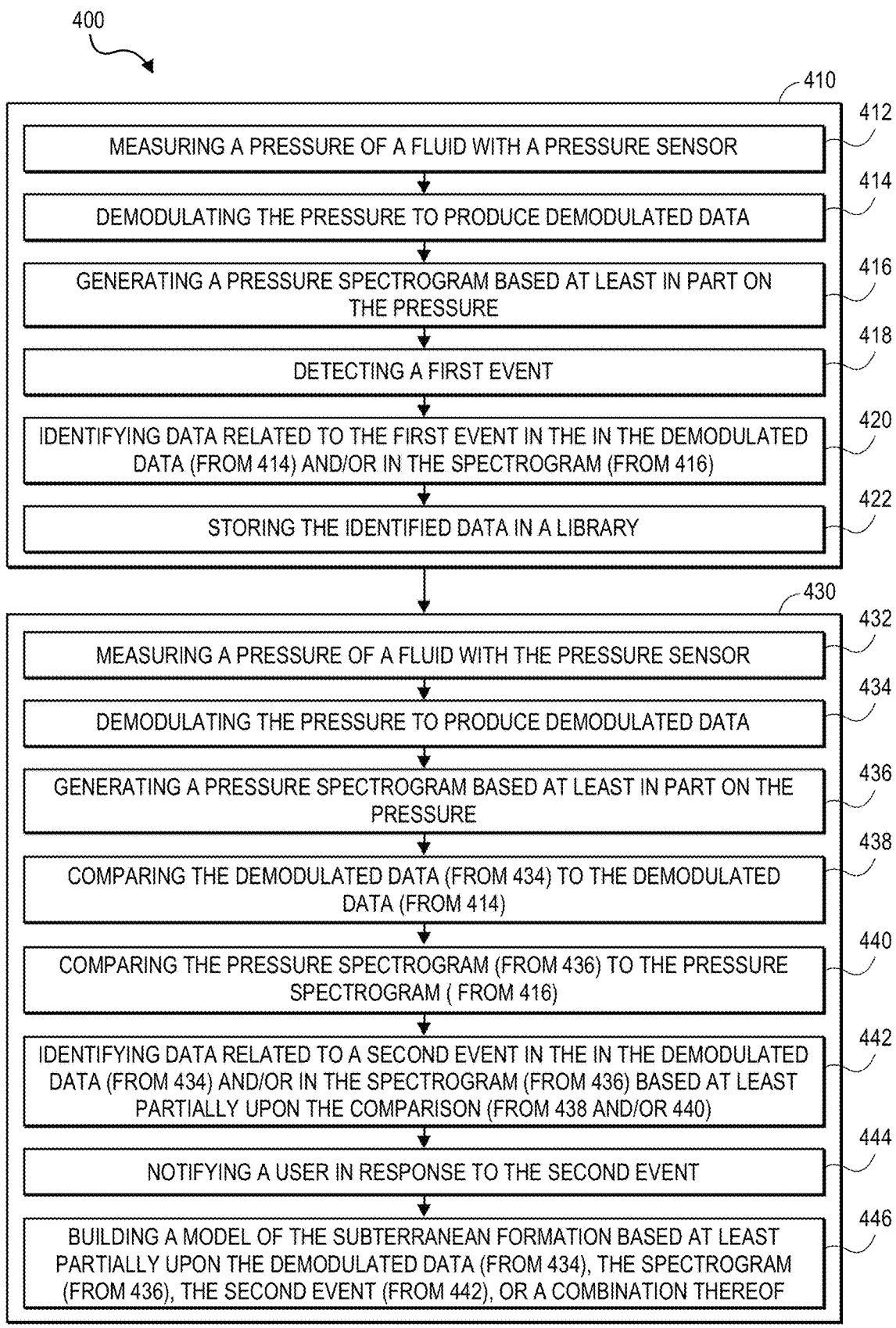
FIG. 4 illustrates a flowchart of a method for detecting an event based at least in part on data in the pressure spectrogram, according to an embodiment.

FIG. 4 illustrates a flowchart of a method 400 for detecting an event based, according to an embodiment. The method 400 may include a training portion 410 and a detecting portion 430. As will be appreciated, in some embodiments, at least some of the training portion 410 may be performed using past (i.e., historical) data.

Training Portion 410

The training portion 410 of the method 400 may include measuring a pressure of a fluid with the pressure sensor 260, as at 412. The fluid may be pumped into the wellbore 220, disposed in the wellbore 220, and/or flowing out of the wellbore 220. The fluid may include a plurality of pressure pulses from the downhole tool 240.

The training portion 410 of the method 400 may also include demodulating the pressure to produce demodulated data transmitted from the downhole tool 240, as at 414. More particularly, the pressure sensor 260 and/or the computing system 500 may demodulate the data in the pressure pulses to extract the data measured by the MWD 242 and/or the LWD 244. The demodulated data may be or include physical properties (e.g., pressure, temperature, wellbore trajectory) measured by the MWD 242 and/or formation properties (e.g., porosity, permeability) measured by the LWD 244.

The training portion 410 of the method 400 may also include generating a pressure spectrogram 300 based at least in part on the pressure, as at 416. The pressure spectrogram 300 may be generated before, simultaneously with, or after the measured pressure is demodulated. Generating the pressure spectrogram 300 may include transforming the measured pressure from a time domain into a frequency domain.

The training portion 410 of the method 400 may also include detecting a first event, as at 418. The first event may be detected without using the data from the pressure sensor 260. More particularly, the first event may be detected without using the demodulated data and/or without using the spectrogram 300. For example, when the first event includes the tubular string 230 and/or downhole tool 240 being stuck in the wellbore 220, this may be detected by a user or sensor (e.g., not the pressure sensor 260) seeing/sensing that rotation has reduced or stopped. In another example, when the first event includes the tubular string 230 and/or downhole tool 240 twisting-off, this may be detected by a user or sensor (e.g., not the pressure sensor 260) seeing/sensing that the hook load has reduced. In yet another example, when the first event includes a washout, this may be detected by a user or sensors that are available at the wellsite. A washout is a specific trend of pressure and flow of the fluid in the wellbore as measured by surface sensors. In one embodiment, physics models are applied to detect the washout event. In another embodiment, the washout can be detected by engineers looking at the trends. In yet another example, when the first event includes a blowout, this may be detected by a user or sensor (e.g., not the pressure sensor 260) seeing/sensing an uncontrolled flow of fluids from the wellbore 220. In yet another example, when the first event includes a failure of the pump 250, this may be detected by a user or sensor (e.g., not the pressure sensor 260) seeing/sensing that pressure and/or flow from the pump 250 is not within a predetermined range, or the user hearing abnormal noises emerging from the pump 250.

In at least one embodiment, detecting the first event may include determining details about the first event. The details may also be determined at this stage without using the data from the spectrogram 300. For example, the details may be or include the time that the first event occurred, the location of the first event, the rotation rate (e.g., of the tubular string 230 and/or downhole tool 240), the hook load (e.g., weight of the tubular string 230 and/or downhole tool 240), the flow rate (e.g., of the fluids), the pressure (e.g., of the fluids), the temperature (e.g., of the fluids), the torque on the tubular string 230 and/or the downhole tool 240, a combination thereof, or the like.

In at least one embodiment, after the first event has occurred (or while the first event is occurring), the training portion 410 of the method 400 may also include identifying data related to the first event in the demodulated data (e.g., from 414) and/or in the spectrogram 300 (e.g., from 416), as at 420. For example, the data in the circle 320 in the spectrogram 300 may be determined to be related to the first event by determining that a time in the spectrogram 300 matches the time of the event. Any portion of the data in the spectrogram 300 that has a start time and/or a finish time that corresponds to the time of the event may be identified as corresponding to the event. The event may then be labelled in the spectrogram 300 with the type of event and/or the details of the event. As discussed below, once a plurality of the events are identified and labelled in a plurality of spectrograms, the system may be trained to autonomously identify similar events in spectrograms using machine learning algorithms.

In at least one embodiment, identifying data 320 related to the first event may also include identifying data related to the particular details of the first event (e.g., in the spectrogram 300). For example, it may be determined that the data in the circle 320 in the spectrogram 300 includes details related to the first event by analyzing the peaks and valleys of the data in the circle 320 and comparing these peaks and valleys to the details of the event (e.g., flow rate).

The method 400 may also include storing the identified data in a library, as at 422. Storing the identified data may include storing the demodulated data (e.g., including the data related to the first event), the spectrogram 300 (e.g., including the data 320 related to the first event), the first event type, the details of the first event, or a combination thereof. The identified data may also include an identified link between the data related to the first event (e.g., in the demodulated data and/or the spectrogram 300) and the type/details of the first event, such that future demodulated data and/or spectrograms containing similar data may be used to identify corresponding events, as described in the detection portion 430 of the method 400 below.

One or more parts of the training portion 410 of the method 400 may be repeated (e.g., iteratively) to populate the library with a plurality of results. This may include a plurality of results for each type of event (e.g., multiple types of events). The results may be related to a single wellbore 220 or a plurality of different wellbores. The results may be related to a single downhole tool 240 or a plurality of different downhole tools. The library may be stored in (e.g., a storage media 506 in) the computing system 500 described below. The library may be part of, or in communication with, a machine-learning (ML) model on the computing system 500, which may be used to perform at least a portion of the method 400. Once the training portion 410 of the method 400 is complete, the method 400 may proceed to the detecting portion 430.

Detecting Portion 430

Although some of the same reference numbers are used in both the descriptions of the training portion 410 and the detecting portion 430, it will be appreciated that, for example, the wellbore in the training portion may be the same as or different from the wellbore in the detecting portion, the downhole tool in the training portion 410 may be the same as or different from the downhole tool in the detecting portion, the pressure sensor in the training portion 410 may be the same as or different from the pressure sensor in the detecting portion 430, etc. Accordingly, the measured pressure in the training portion 410 may be the same as or different from the measured pressure in the detecting portion 430, the demodulated data in the training portion 410 may be the same as or different from the demodulated data in the detecting portion 430, the pressure spectrogram in the training portion 410 may be the same as or different from the pressure spectrogram in the detecting portion 430, the event in the training portion 410 may be the same as or different from the event in the detecting portion 430, etc. In at least one embodiment, the training portion 410 may be referred to as past or historical, and the detecting portion 430 may be referred to as current or present because it occurs after the training portion 410.

The detecting portion 430 of the method 400 may include measuring a pressure of a fluid with the pressure sensor 260, as at 432. The fluid may be pumped into the wellbore 220, disposed in the wellbore 220, and/or flowing out of the wellbore 220. The fluid may include a plurality of pressure pulses from the downhole tool 240.

The detecting portion 430 of the method 400 may also include demodulating the pressure to produce demodulated data transmitted from the downhole tool 240, as at 434. More particularly, the pressure sensor 260 and/or the computing system 500 may demodulate the data in the pressure pulses to extract the data measured by the MWD 242 and/or the LWD 244. The demodulated data may be or include physical properties (e.g., pressure, temperature, wellbore trajectory) measured by the MWD 242 and/or formation properties (e.g., porosity, permeability) measured by the LWD 244.

The detecting portion 430 of the method 400 may also include generating a pressure spectrogram based at least in part on the pressure, as at 436. As mentioned above, the pressure spectrogram generated at 436 may appear similar to the spectrogram 300 in FIG. 3 and generated above at 416; however, it will be appreciated that the spectrogram generated at 436 may correspond to a different time, a different wellsite, a different wellbore, a different downhole tool, a different event, etc., and thus may have some differences from the spectrogram 300 in FIG. 3 and generated above at 416. The pressure spectrogram (e.g., at 436) may be generated before, simultaneously with, or after the pressure is demodulated. Generating the pressure spectrogram (e.g., at 436) may include transforming the measured pressure from a time domain into a frequency domain.

The detecting portion 430 of the method 400 may also include comparing the demodulated data (e.g., from 434) to the demodulated data (e.g., from 414), as at 438. As mentioned above, the demodulated data (e.g., from 414) may be related to the first event. Thus, as described below, if the demodulated data (e.g., from 434) is similar to the demodulated data (e.g., from 414), this may be an indication that the demodulated data (e.g., from 434) is related to a second event.

The detecting portion 430 of the method 400 may also include comparing the pressure spectrogram (e.g., from 436) to the pressure spectrogram (e.g., from 416), as at 440. As mentioned above, the pressure spectrogram (e.g., from 416) may be related to the first event. Thus, as described below, if the pressure spectrogram (e.g., from 436) is similar to the pressure spectrogram (e.g., from 416), this may be an indication that the pressure spectrogram (e.g., from 436) is related to a second event.

The detecting portion 430 of the method 400 may also include identifying data related to a second event in the demodulated data (e.g., from 434) and/or in the spectrogram (e.g., from 436) based at least partially upon the comparison (e.g., from 438 and/or 440), as at 442. For example, the second event may be detected by comparing the second set of demodulated data to the first set of demodulated data (e.g., in the library). More particularly, when the second set of demodulated data is determined to be similar to the first set of demodulated data in the library, it may be determined that the second set of demodulated data corresponds to the same type of event as the first set of demodulated data in the library.

In another example, the second event may be detected by comparing the second spectrogram to the first spectrogram (e.g., in the library). More particularly, when the second spectrogram includes data that is determined to be similar to the event data 320 in the first spectrogram 300 in the library, it may be determined that the data in the second spectrogram corresponds to the same type of event as the event data 320 in the spectrogram 300 in the library.

In at least one embodiment, detecting the event may also include determining details about the event. The details may also be detected by comparing the second set of demodulated data to the first set of demodulated data in the library.

In another example, the details may be detected by comparing the second pressure spectrogram to the first pressure spectrogram in the library).

The method 400 may also include notifying a user in response to the second event, as at 444. Notifying the user may include sending the user an alert that the second event is occurring or has occurred. The user may be notified substantially in real time when the second event is detected. For example, the user may be notified within 60 seconds or less, 30 seconds or less, or 10 seconds or less from the time that the downhole tool 240 captures the information containing the event data.

The method 400 may also include building a model of the subterranean formation based at least partially upon the demodulated data (e.g., from 434), the spectrogram (e.g., from 436), the second event (e.g., from 442), or a combination thereof, as at 446. The model may indicate/show a cause of the second event, a likelihood and/or location of hydrocarbons in the subterranean formation, or the like. The model may be used to determine where to drill the wellbore or a subsequent wellbore, or where to steer the downhole tool 240 during drilling of the wellbore or the subsequent wellbore, based at least partially upon the event (e.g., to avoid the event or future similar events). In another embodiment, the model may be used to vary the weight on the downhole tool 240 (i.e., the WOB), vary the flow rate and/or properties of the fluid being pumped into the wellbore, or the like.

Figure 5:
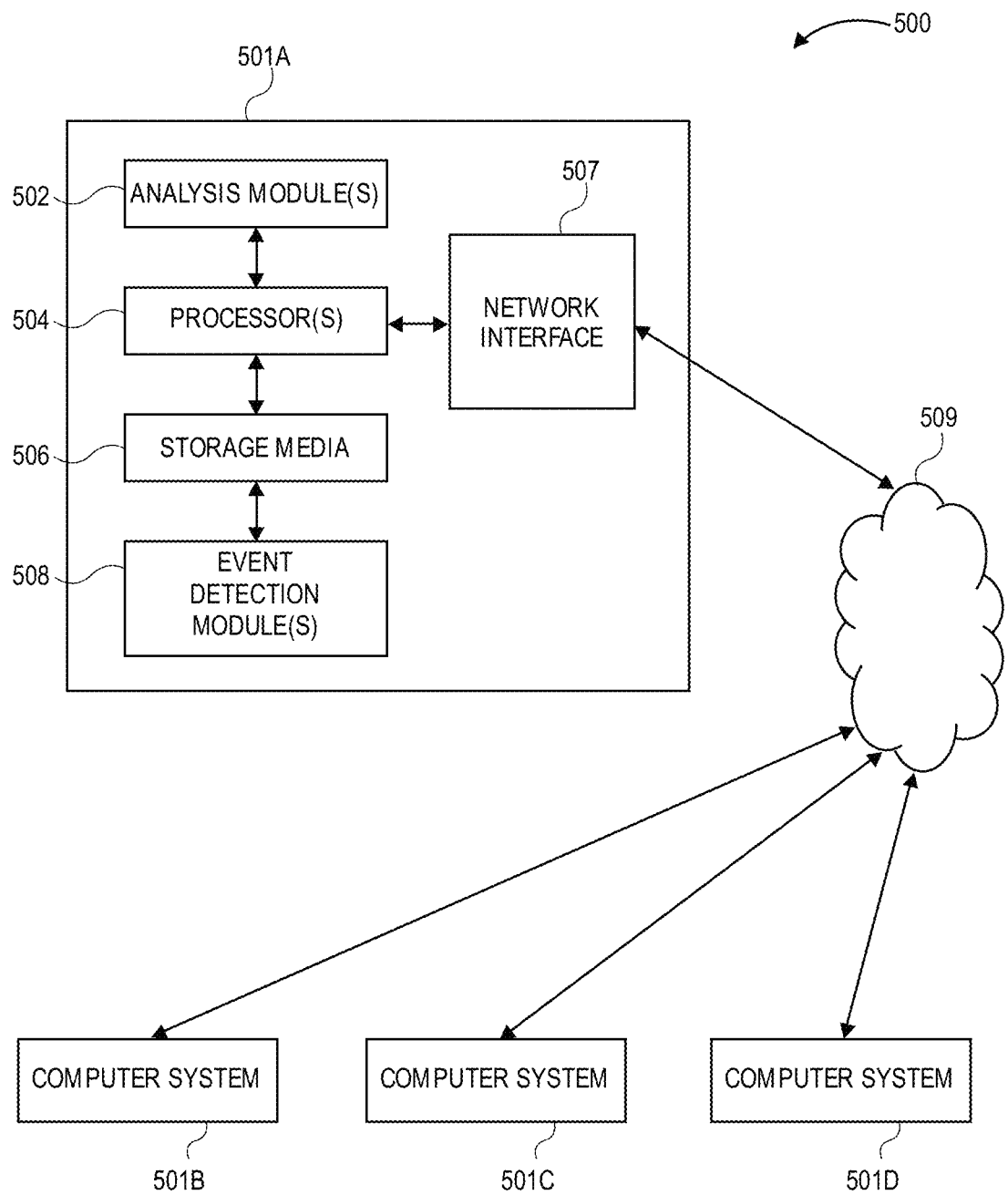
FIG. 5 illustrates a schematic view of a computing system for performing at least a portion of the method, according to an embodiment.

In some embodiments, the methods of the present disclosure may be executed by a computing system. FIG. 5 illustrates an example of such a computing system 500, in accordance with some embodiments. The computing system 500 may include a computer or computer system 501A, which may be an individual computer system 501A or an arrangement of distributed computer systems. The computer system 501A includes one or more analysis modules 502 that are configured to perform various tasks according to some embodiments, such as one or more methods disclosed herein. To perform these various tasks, the analysis module 502 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor may include a microprocessor, microcontroller, processor module or subsystem, programmable integrated circuit, programmable gate array, or another control or computing device.

The storage media 506 may be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 500 contains one or more event detection module(s) 508 configured to perform at least a portion of the method 400. It should be appreciated that computing system 500 is merely one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 500, FIG. 5), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enabling others skilled in the art to best utilize the disclosed embodi-

What is claimed is:

1. A method for detecting a downhole event within a wellbore, comprising:
receiving historical pressure data collected with one or more pressure sensors at a plurality of wellbores, the historical pressure data comprising a plurality of historical pressure pulses within drilling fluid at the plurality of wellbores, the plurality of historical pressure pulses being associated with a plurality of downhole operations of a plurality of downhole tools within the plurality of wellbores;
generating a plurality of historical pressure spectrograms from the historical pressure data, the plurality of historical pressure spectrograms each representing a spectrum of frequencies of the plurality of historical pressure pulses over time;
identifying, independent of the plurality of historical pressure spectrograms, a plurality of historical downhole events that occurred during the plurality of downhole operations;
correlating the plurality of historical downhole events to the plurality of historical pressure spectrograms to generate labelled training pressure spectrograms;
training a pressure spectrogram machine learning model based on the labelled training pressure spectrograms to identify pressure signatures in the labelled training pressure spectrograms corresponding to the identified plurality of historical downhole events, the pressure spectrogram machine learning model being trained to identify downhole events from input pressure spectrograms;
identifying, with a pressure sensor at a surface of a target wellbore, target pressure data comprising a plurality of target pressure pulses within a flow of a target drilling fluid, the plurality of target pressure pulses being associated with a target downhole operation of a target downhole tool;
based on the target pressure data, generating a target pressure spectrogram;
using the target pressure spectrogram as input to the pressure spectrogram machine learning model, identifying a target downhole event affecting the target downhole operation; and
based on identifying the target downhole event, generating a notification indicating an abnormal operation of the target downhole tool.

2. The method of claim 1, further comprising, with a pump at the surface of the wellbore, pumping the flow of the target drilling fluid from the surface, through the target wellbore to the target downhole tool positioned in the target wellbore, and back to the surface, wherein the plurality of target pressure pulses is based on the abnormal operation of the target downhole tool in the target wellbore.

3. The method of claim 2, wherein the target downhole event includes at least one of abnormal drilling operations, abnormal completion operations, or abnormal production operations of the target downhole tool that generate the plurality of target pressure pulses corresponding with one or more pressure signatures that are visible in the target pressure spectrogram.

4. The method of claim 1, wherein the target downhole event includes one or more of abnormal drilling operations, abnormal completion operations, or abnormal production operations of the target downhole tool that generates the plurality of target pressure pulses corresponding with one or more pressure signatures that are visible in the target pressure spectrogram.

5. The method of claim 4, further comprising generating the notification in real time.

6. The method of claim 1, further comprising generating the notification in real time.

7. The method of claim 6, further comprising building a model of a subterranean formation based at least partially upon the target downhole event.

8. The method of claim 1, further comprising building a model of a subterranean formation based at least partially upon the target downhole event.

9. The method of claim 8, wherein the pressure spectrogram machine learning model identifies the target downhole event based on identifying one or more pressure signatures in the target pressure spectrogram that are similar to one or more pressure signatures in the labelled training pressure spectrograms.

10. The method of claim 1, wherein the pressure spectrogram machine learning model identifies the target downhole event based on identifying one or more pressure signatures in the target pressure spectrogram that are similar to one or more pressure signatures in the labelled training pressure spectrograms.

11. The method of claim 1, further comprising transmitting a downhole tool signal via a plurality of transmitting pressure pulses in the flow of the target drilling fluid to the target downhole tool to instruct the target downhole tool to perform the target downhole operation, wherein the target downhole event corresponds with the target downhole tool performing the abnormal operation.

12. The method of claim 11, further comprising identifying interference in the target pressure spectrogram and determining that the target downhole tool performing the abnormal operation is based on the interference interfering with the downhole tool signal.

13. The method of claim 12, wherein the interference includes at least one of:
harmonics of a pump pumping the flow of the target drilling fluid;
electrical noise from a motor, generator, or other electrical wellsite equipment;
downhole sounds associated with movement of the target downhole tool or a tubular string; or
vibrations generated by the tubular string, the target downhole tool, or surface equipment.

14. The method of claim 13, further comprising modifying the interference to avoid interfering with the downhole tool signal based on modifying at least one of the pump, the electrical noise, the downhole sounds, or the vibrations.

15. The method of claim 9, further comprising modifying the downhole tool signal to avoid the interference.

16. The method of claim 1, further comprising identifying the plurality of historical downhole events without using the historical pressure data.

17. The method of claim 1, wherein the target downhole event is selected from a group consisting of: a tubular string being stuck in the wellbore, the target downhole tool being stuck in the wellbore, the tubular string twisting-off in the wellbore, the target downhole tool twisting-off in the wellbore, a washout, a blowout, and failure of a pump.

18. The method of claim 1, further comprising steering the target downhole tool based at least partially upon identifying the target downhole event.

19. A system, comprising:
at least one processor;

memory in electronic communication with the at least one processor; and instructions stored in the memory, the instructions being executable by the at least one processor to:

receive historical pressure data collected with one or more pressure sensors at a plurality of wellbores, the historical pressure data comprising a plurality of historical pressure pulses within drilling fluid at the plurality of wellbores, the plurality of historical pressure pulses being associated with a plurality of downhole operations of a plurality of downhole tools within the plurality of wellbores;

generate a plurality of historical pressure spectrograms from the historical pressure data, the plurality of historical pressure spectrograms each representing a spectrum of frequencies of the plurality of historical pressure pulses over time;

identify, independent of the plurality of historical pressure spectrograms, a plurality of historical downhole events that occurred during the plurality of downhole operations;

correlate the plurality of historical downhole events to the plurality of historical pressure spectrograms to generate labelled training pressure spectrograms;

train a pressure spectrogram machine learning model based on the labelled training pressure spectrograms to identify pressure signatures in the labelled training pressure spectrograms corresponding to the identified plurality of historical downhole events, the pressure spectrogram machine learning model being trained to identify downhole events from input pressure spectrograms;

identify, with a pressure sensor at a surface of a target wellbore, target pressure data comprising a plurality of target pressure pulses within a flow of a target drilling fluid, the plurality of target pressure pulses being associated with a target downhole operation of a target downhole tool;

based on the target pressure data, generate a target pressure spectrogram;

using the target pressure spectrogram as input to the pressure spectrogram machine learning model, identify a target downhole event affecting the target downhole operation; and based on identifying the target downhole event, generate a notification indicating an abnormal operation of the target downhole tool.

20. A computer-readable storage medium including instruction that, when executed by at least one processor, cause the processor to:

receive historical pressure data collected with one or more pressure sensors at a plurality of wellbores, the historical pressure data comprising a plurality of historical pressure pulses within drilling fluid at the plurality of wellbores, the plurality of historical pressure pulses being associated with a plurality of downhole operations of a plurality of downhole tools within the plurality of wellbores;

generate a plurality of historical pressure spectrograms from the historical pressure data, the plurality of historical pressure spectrograms each representing a spectrum of frequencies of the plurality of historical pressure pulses over time;

identify, independent of the plurality of historical pressure spectrograms, a plurality of historical downhole events that occurred during the plurality of downhole operations;

correlate the plurality of historical downhole events to the plurality of historical pressure spectrograms to generate labelled training pressure spectrograms;

train a pressure spectrogram machine learning model based on the labelled training pressure spectrograms to identify pressure signatures in the labelled training pressure spectrograms corresponding to the identified plurality of historical downhole events, the pressure spectrogram machine learning model being trained to identify downhole events from input pressure spectrograms;

identify, with a pressure sensor at a surface of a target wellbore, target pressure data comprising a plurality of target pressure pulses within a flow of a target drilling fluid, the plurality of target pressure pulses being associated with a target downhole operation of a target downhole tool;

based on the target pressure data, generate a target pressure spectrogram;

using the target pressure spectrogram as input to the pressure spectrogram machine learning model, identify a target downhole event affecting the target downhole operation; and based on identifying the target downhole event, generate a notification indicating an abnormal operation of the target downhole tool.

\* \* \* \* \*